US009864674B2

(12) United States Patent
Singi et al.

(10) Patent No.: US 9,864,674 B2
(45) Date of Patent: Jan. 9, 2018

(54) TEST CASE GENERATION SYSTEM

(71) Applicant: Accenture Global Services Limited, Dublin (IE)

(72) Inventors: Kapil Singi, Bangalore (IN); Dipin Era, Thalassery (IN); Vikrant Kaulgud, Pune (IN)

(73) Assignee: Accenture Global Services Limited, Dublin (IE)

( * ) Notice: Subject to any disclaimer, the term of this patent is extended or adjusted under 35 U.S.C. 154(b) by 9 days.

(21) Appl. No.: 14/790,534

(22) Filed: Jul. 2, 2015

(65) Prior Publication Data

US 2016/0217062 A1 Jul. 28, 2016
US 2017/0337121 A9 Nov. 23, 2017

(30) Foreign Application Priority Data

Jan. 22, 2015 (IN) .............................. 314/CHE/2015
Jun. 15, 2015 (IN) .............................. 314/CHE/2015

(51) Int. Cl.
*G06F 9/45* (2006.01)
*G06F 11/36* (2006.01)

(52) U.S. Cl.
CPC ...... *G06F 11/3684* (2013.01); *G06F 11/3664* (2013.01)

(58) Field of Classification Search
CPC ............. G06F 11/3684; G06F 11/3608; G06F 11/3664; G06F 11/3676; G06F 8/38
See application file for complete search history.

(56) References Cited

U.S. PATENT DOCUMENTS

2003/0005413 A1* 1/2003 Beer .................... G06F 11/3664
717/125
2004/0001092 A1* 1/2004 Rothwein ................. G06F 8/38
715/763
2010/0082954 A1* 4/2010 Lim ........................ G06F 17/50
713/1

OTHER PUBLICATIONS

Australian Patent Examination Report No. 2 for Patent Application No. 2016200383 dated May 22, 2017; 2 pages.
Australia Patent Examination Report No. 1 for Patent Application No. 2016200383, dated Nov. 10, 2016, 3 pages.

* cited by examiner

*Primary Examiner* — Li B Zhen
*Assistant Examiner* — Lenin Paulino
(74) *Attorney, Agent, or Firm* — Brinks Gilson & Lione

(57) ABSTRACT

A method and system generate test cases for applications that include User Graphical Interfaces (GUIs). The system may extract GUI information from prototype requirements (e.g., interactive wireframes), generate a screen model for each screen of the GUI by using a subset of extracted GUI information, generate an application model representing the prototype requirements by combining the screen model for each screen, and generate test cases by using the sequence of the GUICs and the event types included in the test path and a semantic knowledge base. The semantic knowledge base is generated by using the relationships between GUICs and the GUIC events.

20 Claims, 16 Drawing Sheets

Process Flow - Generations of Test Cases from Specifications in Interactive Wireframes

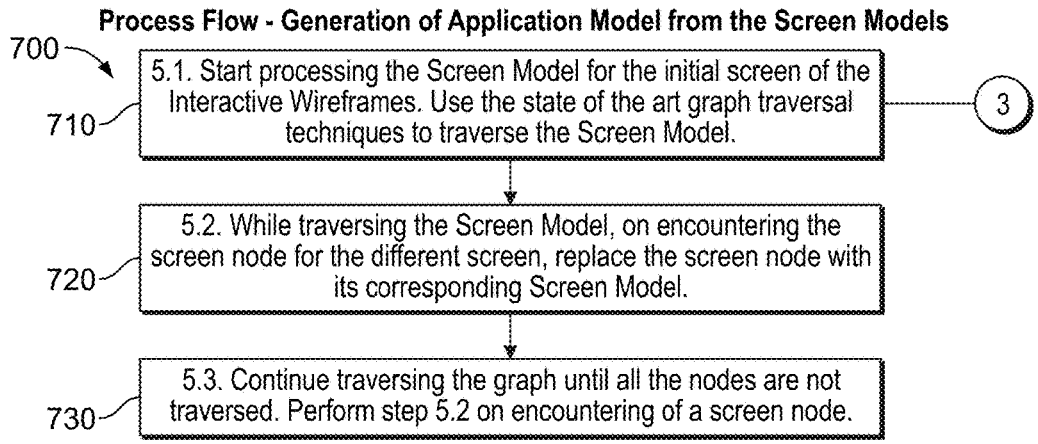

FIG. 7

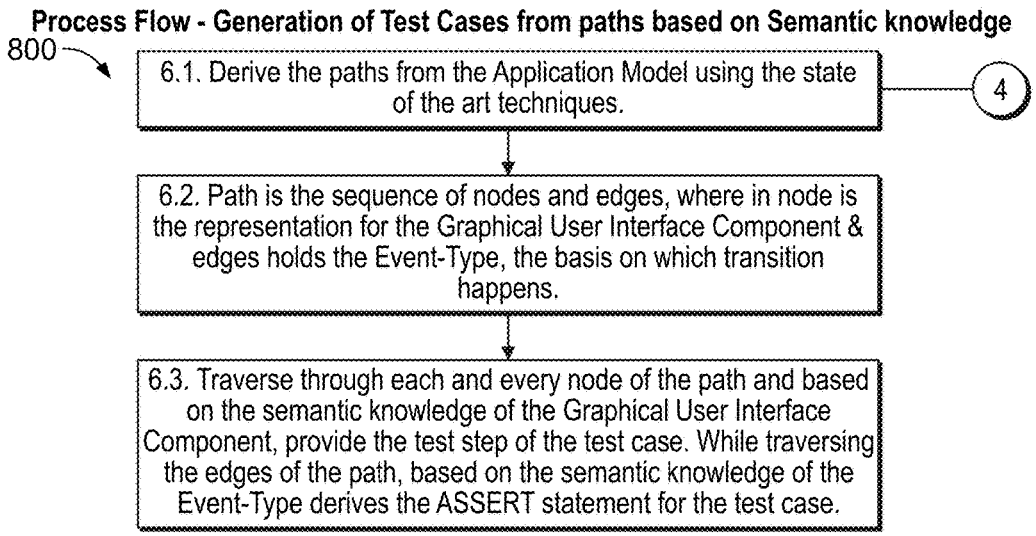

FIG. 8

Semantic Knowledge for the Graphical User Interface Components 902

| Component | Type | Template | Comments |
|---|---|---|---|
| Text-box | Input | Enter #value# in the $text-box$ field | #value# -> data & $text-box$ -> component name |
| Button | Actionable | Click on the $button$ | $button$ -> component name |

Semantic Knowledge for the Event-Type on the Edge 904

| Event-Type | Template | Comments |
|---|---|---|
| Navigate | ASSERT -> $Component$ is loaded | $Component$ -> component name |
| Hide | ASSERT -> $Component$ is not visible | $Component$ -> component name |

FIG. 9

Sample Screen of Interactive Wireframes

Generation of Screen Navigation Model from the Summarized Screen Models

TEST CASE GENERATION SYSTEM

CROSS-REFERENCE TO RELATED APPLICATIONS

This application claims priority to Indian patent application No. 314/CHE/2015, filed on Jun. 15, 2015, which claims priority to an Indian provisional patent application with the same serial number, No. 314/CHE/2015, filed on Jan. 22, 2015, the content of both of which are hereby entirely incorporated by reference.

TECHNICAL FIELD

This disclosure is in the areas of software specifications, verification and testing, model generation, model based testing, test automation and test artifacts generation. This disclosure also relates to test case generation for applications that use Graphical User Interfaces (GUIs).

BACKGROUND

Rapid advances in computer and communication technologies rely on properly functioning and increasingly complex software applications. As a result, numerous efforts in software engineering have attempted to find ways to comprehensively test applications under development. As test design, test generation, and test execution contribute to a large percentage of overall project cost for a new application, improvements in software testing will provide significant benefits to computer application development.

BRIEF DESCRIPTION OF THE DRAWINGS

FIG. 7 shows an example of process flow for generation of application model from the screen models.

FIG. 8 shows an example of process flow for generation of test cases based on semantic knowledge.

FIG. 9 shows an example of semantic knowledge for the GUI components.

DETAILED DESCRIPTION

Graphical user interfaces (GUIs) are an extremely common mechanism used to interact with today's software applications. The system described below facilitates the generation of test cases in order to help ensure the functional correctness of a GUI for the correct operation, safety, robustness and usability of an application. Interactive wireframes, sometimes referred to as "prototypes" may be employed as a requirements elicitation technique used to capture the detailed functionality of the software system.

A prototype may be built during the requirements engineering phase of application development. A prototype may not only capture the core functionality requirements but also capture in detail the various user interface components which take part in the interaction with the user or other components of the system.

The system described below may automatically create models (e.g., using control flow graphs) from the prototype requirements and convert the derived paths from the model to test cases for the application, using the semantic knowledge of the Graphical User Interface Components and event conditions.

In today's environment, many tools may be used to capture requirements in Interactive Wireframes, also known as prototypes. Prototyping is helpful because of the large number of interacting technologies, stakeholders and devices that may make it challenging to document specifications in plain text. Prototyping may facilitate "rapid" visualization of precise requirements with inherent benefits such as visualization, minute detail, less ambiguity, responsive behavior and sooner client validation.

Prototyping may capture the specifications from two different perspectives e.g., User Interface and Application Behavior. Application Behavior may be described in a constrained natural language format using events and conditions. However, these behavioral aspects may not be directly visible in the wireframes and therefore pose a significant challenge to identify them.

The system described below provides an approach for automating the generation of test cases.

The system extracts the User Interface and Application Behavioral information from the prototype requirements, converts them into various models and then by using the semantics of the Graphical User Interface Components & event conditions, derives the test cases from the model. A test case referred here may be a sequence of steps to test for the correct behaviour, functionality and/or features of an application based on the specifications.

Figure 1:
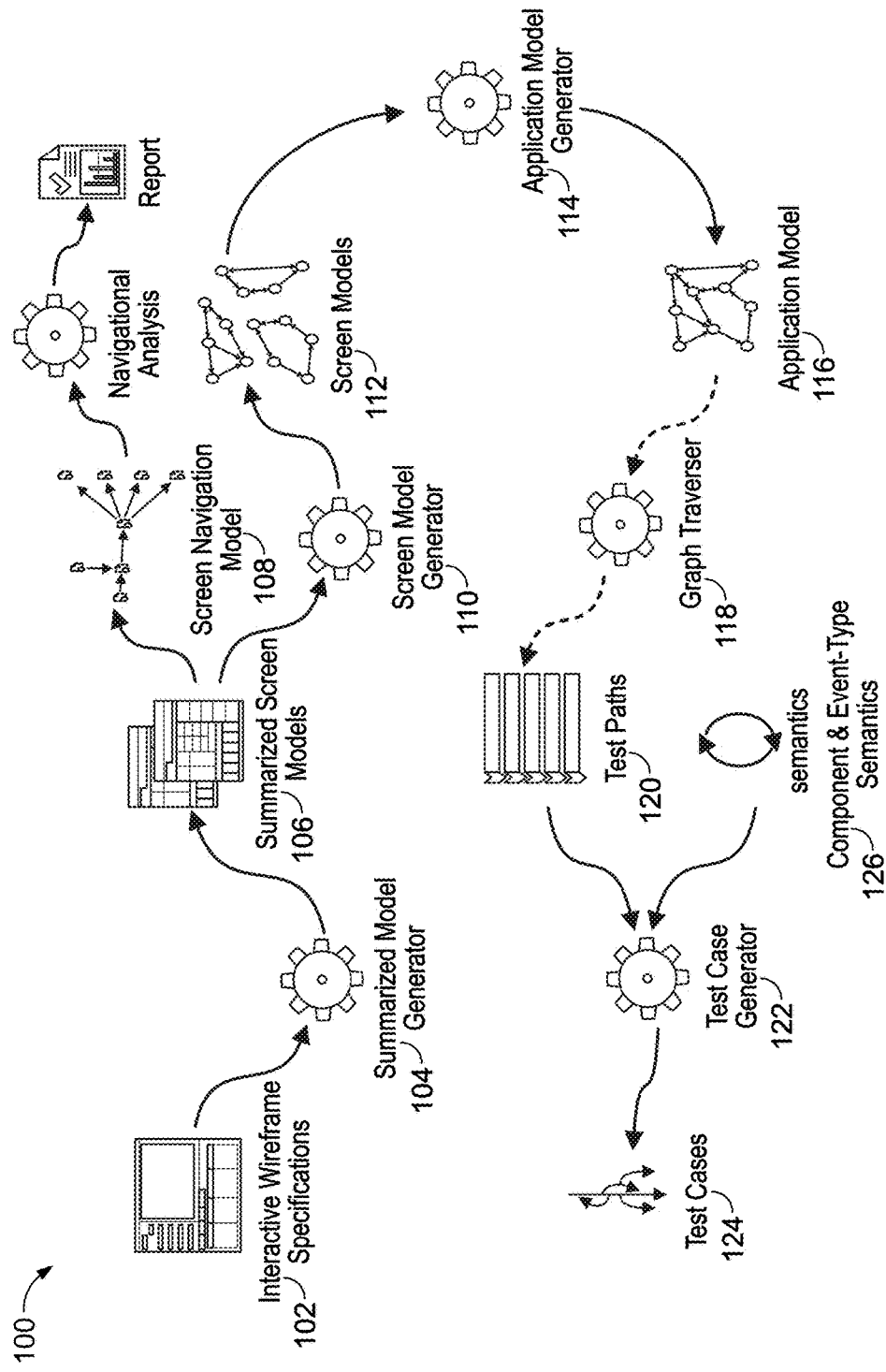
FIG. 1 shows an example system diagram that depicts the logical execution phases for the generation of test cases.

FIG. 1 shows an example system diagram that depicts the logical execution phases for the generation of test cases 100.

The summarized model generator 104 shown in FIG. 1 may take the requirements as input, and may extract the information related to all the interactive wireframe screens 102. The Graphical User Interface elements of the interactive wireframe screen are referred to as Graphical User Interface Components (GUIC). Screen information may include all the GUICs and their behaviour in the form of relationships and events.

This information captured may be represented as an intermediate screen model, referred to as the Summarized Screen Model 106 in FIG. 1. Information captured in Summarized Screen Models, may lead to the Screen Navigation Model 108, which may depict the navigational flow between the various screens of the interactive wireframe requirements. The Screen Model Generator 110 may take the Summarized Screen Model 106 as the input, and based on the captured relationship and structural positioning of the components may derive the behavioural flow model called a Screen Model 112, for each screen.

The Application Model Generator 114 may take all the Screen Models 112 as input and combine them to generate the Application Model 116. The Application Model 116 may represent the interactive wireframe requirements.

The system may reference the semantic knowledge base 126 for the Graphical User Interface Components and for the event-types mentioned in the condition & events of the components. The Graph Traverser 118 may traverse the Application Model 116 and may identify the test paths from the application model 116 The generated test paths 120 may be a sequence of nodes (GUIC) & edges (Event-types) which the test case generator module 122 may transform into the test cases 124, by using the semantic knowledge base 126.

Figure 2:
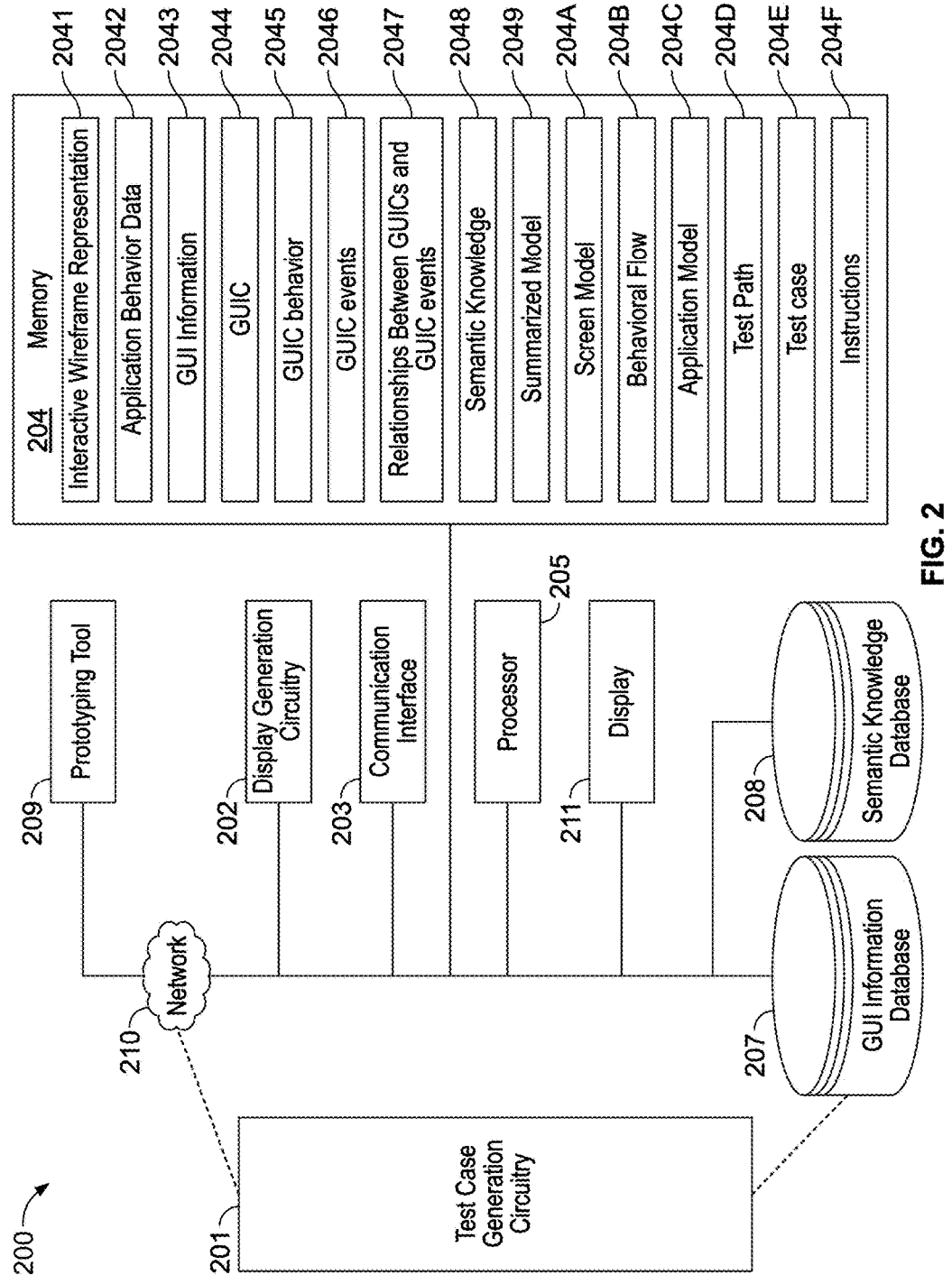
FIG. 2 shows an example system diagram that depicts the test case generation system.

FIG. 2 shows an example system diagram that depicts the test case generation system 200. As illustrated in FIG. 2, the system 200 may include test case generation circuitry 201, display generation circuitry 202, communication interface 203, processor 205. The system 200 may include memory 204 that may store Interactive wireframe representation 2041, Application behavior data 2042, GUI information 2043, GUIC 2044, GUIC behavior 2045, GUIC events 2046, Relationships between GUICs and GUIC events 2047, semantic knowledge 2048, summarized model 2049, screen model 204A, behavioral flow 204B, application model 204C, test path 204D, test case 204E and Instructions 204F.

The system 200 may also include GUI information database 207 and Semantic knowledge database 208. The system 200 may connect with prototyping tool 209 via network 210. The prototyping tool 209 may be tools like Just-In-Mind or Axure. The system 200 may be in local or remote communication with a display 211, e.g., a local monitor, an application interface on a smart phone, or another display.

The communication interface 203 may be configured to receive, from an application prototyping tool 209, an interactive wireframe representation 2041 of a graphical user interface (GUI) of an application, and application behavior data 2042 for the application. Both the interactive wireframe representation 2041 and the application behavior data 2042 may be captured by the application prototyping tool 209.

The GUI information database 207 may be configured to store the interactive wireframe representation 2041 and the application behavior data 2042 after the prototyping tool 209 captures the interactive wireframe representation 2041 and the application behavior data 2042.

Test case generation circuitry 201 may be in communication with the GUI information database 207. The memory 204 may include instructions 204F executed by one or more processors 205 that may cause the test case generation circuitry 201 to perform the following, as examples:

extract GUI information 2043 from the interactive wireframe representation 2041 and the application behavior data 2042 stored in the GUI information database 207, where the GUI information 2043 may include Graphical User Interface Components (GUIC) 2044, GUIC behavior 2045, and GUIC events 2046 for the GUI determine relationships between the GUICs and the GUIC events 2047 as part of the GUI information 2043. As the GUICs are standard GUI components, semantic knowledge base is created and stored based on the components characteristics such as GUIC "Text box" will have a semantic of entering value and hence may store the semantic knowledge 2048 in a semantic knowledge database 208.

generate a summarized model 2049 of the GUI from the GUI information 2043. Generate a screen model 204A for selected screens of the GUI using a subset of extracted GUI information 2043 in the summarized model 2049, where the screen model 204A may include a behavioral flow 204B for each screen, and the subset of the extracted GUI information 2043 for generating the screen model may include the relationships 2047 between the GUICs and structural positioning of the GUICs. Generate an application model 204C by combining the screen models 204A for each screen into a unified representation.

traverse the application model 204C to generate a test path 204D that may include a sequence of the GUICs and event types for the GUICs. Generate test cases 204E using the sequence of the GUICs and the event types that may be included in the test path 204E and the semantic knowledge 2048 stored in the semantic knowledge database 208 for the GUI.

The display generation circuitry 202 may be configured to display the generated test cases 204E in a test case window of a user interface on a display 211 in the system 200.

Figure 3:
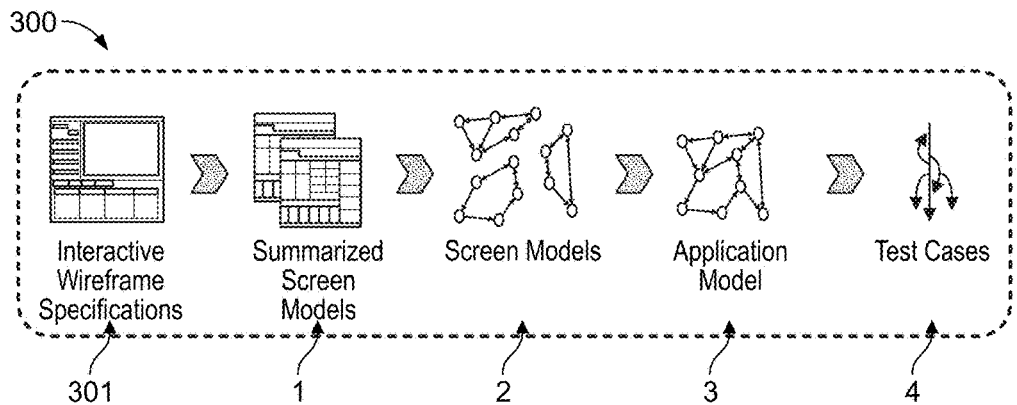
FIG. 3 illustrates an example of high level logic flow for the test case generation system.

FIG. 3 illustrates an example of the high level logic flow 300 for the test case generation system. As shown in FIG. 3, the summarized screen models (stage 1) may be generated by taking inputs from the interactive wireframe specifications 301. The screen models (stage 2) may be generated after the summarized screen models at stage 1 are created. The screen models at stage 2 may obtain data from the summarized screen models at stage 1. The application model (stage 3) may further be created after the screen models at stage 2 are built but before the generation of test cases (stage 4). The data flow may be from screen models at stage 2 to the application model at stage 3 and from the application model at stage 3 to the creation of test cases at stage 4.

Figure 4:
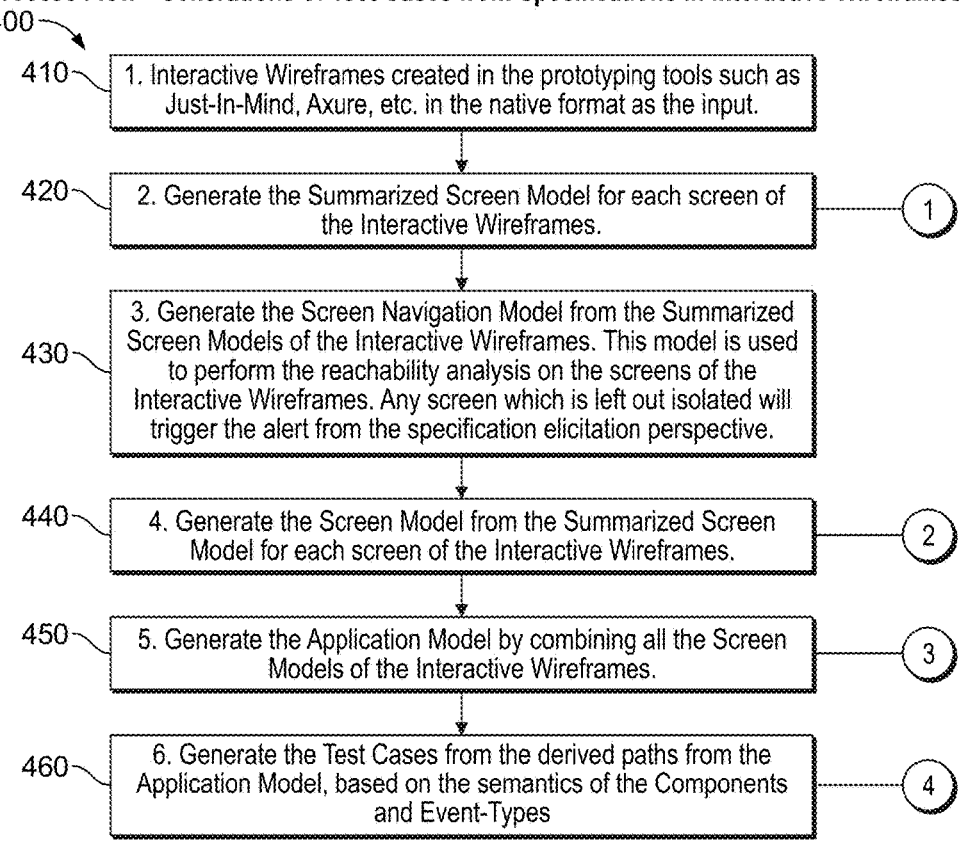
FIG. 4 shows an example of process flow for generation of test cases from interactive wireframe specifications

FIG. 4 illustrates an example of logic 400 for the process flow for generating test cases from specifications in interactive wireframes. The logic 400 may be implemented in the system 200 shown in FIG. 2, for instance, as the instructions 204E in the memory 204. The logic 400 may include receiving, from an application prototyping tool, an interactive wireframe representation of a graphical user interface (GUI) of an application, and application behavior data for the application, where both the interactive wireframe representation and the application behavior data might be captured by the application prototyping tool (410).

A prototyping tool may be used to capture the application user interface and application behavior. Visual requirement specification or prototyping tools like Axure-RP and Justin-Mind may provide intuitive support at the requirement elicitation phase. A prototype tool may capture the user interface (how the application looks) and the behavior (how the application behaves). The prototyping tool visually specifies requirements through a set of screens containing graphical user interface components (GUICs), e.g., screens, text boxes, buttons, link etc.

The behavior (how the application behaves) captured may include the effect of user or environmental stimuli, logical rules, and other behavior. Application behavior captured may be classified as either direct events such as 'go to Screen A if user clicks Button X' or conditional events that may be expressed using constrained natural language which may describe logical rules. The application behavior may not only specify logical rules, but may also embed data. One example of the application behavior may look like:

if cardNumber='123456789'
then
process the order.

A prototype extractor may be used to parse a prototype. A prototype may be a collection of screens. Each screen may contain GUICs and associated behavioral events. The GUICs may have properties such as label, name, component-type, positioning on the screen, and other properties. The associated behavioral events may determine the GUIC event flow. The prototype extractor may be used to parse the native format of a prototype. The extracted information may be captured in a XML format. The prototype extractor may be written for variety of prototype tools which may allow the reuse of the core processing components.

The logic 400 may store the interactive wireframe representation and the application behavior data into a GUI information database after the prototyping tool captures the interactive wireframe representation and the application behavior data. The logic 400 may further extract, by the test case generation circuitry in communication with the GUI information database, GUI information from the interactive wireframe representation and the application behavior data stored in the GUI information database, where the GUI information may include Graphical User Interface Components (GUIC), GUIC behavior and GUIC events for the GUI.

The logic 400 may determine, by the test case generation circuitry, relationships between the GUICs and the GUIC events as part of the GUI information, and the logic 400 may determine, by the test case generation circuitry, semantic knowledge from the relationships between the GUICs and the GUIC events, and store the semantic knowledge in a semantic knowledge database.

The GUICs may include a screen component, a display component, an input/output component, and/or an actionable component. The screen components may be screens or popup windows. The display components may be labels or images. The input/output components may be text box, checkbox, list-box or radio buttons. And the actionable components may be buttons or links, etc.

The application behavior data may include internal behavior events and external behavior events. The internal behaviour events may be component relationships and the external behaviour events may be events for invoking external Graphical User Interface application or service call.

The GUI information may further include component conditional event clauses (CCEC) specifying conditions and component events. The CCEC may include component conditional clauses (CCC) and component event clauses (CEC), where the CCC and the CEC may be associated with the GUICs to determine the relationships.

The CCC may be a condition that is based on the values of the components using the logical operator such as 'AND,' 'OR' and 'NOT.' The CEC may be an event/action such as 'NAVIGATE transaction success', which may be performed on the component based on the outcome of the condition of CCC. The event on the component may subsequently be referred to as Event-Type. The internal behavioural events may be classified into: navigate, show, hide, set value, on focus etc. The internal behavioural events may be represented as: If (Condition=true), then (Event-Type, Component). The external behaviour events may be usually captured by annotations.

The GUI information may include component conditional direct event clause (CDEC) specifying the direct event without any condition. It is represented as (Event-Type, Component).

The GUI information may also include annotations. The annotations may be used to capture an internal behavioral event, or an external behavior event, and/or semantic knowledge associated with the GUIC. The internal behavioral event captured by annotations may be component relationships. The external behavioral event may be events for invoking an external graphical user interface or external service calls. The annotations may be captured by prefixing a pre-selected tag followed by an annotation category. The annotation category may include: the internal behavioral event, the external behavior event, and the semantic knowledge. The pre-selected tag for the annotations may be a "@" sign.

The annotation category for the internal behavioral event may further include: a backward dependency component (BDC), a forward dependency component (FDC), component conditional event clause (CCEC) and component direct event clause (CDEC).

The Backward Dependency Component (BDC) may be component relationships that the annotation captures by mentioning the preceding component. A component may be annotated with multiple BDC (comma separated list), which may determine the sequential flow in order. To annotate, the dependent component may be prefixed @BDC. For example: @BDC Component.

The Forward Dependency Component (FDC) may be the component relationship that the annotation captures by mentioning the succeeding component. A component may be annotated with multiple FDC (comma separated list), which may determine the sequential flow in order. To annotate, the dependent component may be prefixed @FDC. For example: @FDC Component.

The Component Conditional Event Clause (CCEC) may be the condition of the Component Conditional Clause and the set of events associated with Component Event Clause that the annotation captures. To annotate, the Component Conditional Event Clause may be prefixed with @CCEC. The Component Conditional Clause may be prefixed with @Condition, and the Component Event Clause may be prefixed with @Event. For example: @CCEC(@Condition (Component, Conditional Operator, Value) @Event(Event-Type, Component) . . . )

The Component Direct Event Clause (CDEC) may be the direct event clause the annotation captures. To annotate, the Component Direct Event Clause may be prefixed with @CDEC and @Event. For example: @CDEC(@Event (Event-Type, Component)).

The annotation category for the external behavioral event may include an external user interface application (EUIA), the external service call (ESC), and the functional semantics (FS).

The External User Interface Application (EUIA) may be the invocation to the external User Interface application that the annotation captures. The EUIA may be prefixed by @Event. The Event-Type used for this event may be referred as "External GUI Invocation" and may be annotated as @Event (External GUI Invocation, URL).

The External Service Call (ESC) may be the call for the external service that annotation captures. The ESC may be prefixed by @Event. The Event-Type used for this event may be referred as "External Service Call" and may be annotated as @Event (External Service Call, Service call, List<parameters>).

The Functional Semantics (FS) may be the functional semantics to components that the annotation captures. For example, if one is displaying Electrocardiography (ECG) in the screen, attaching the ECG description to the ECG image may provide functional semantics. The knowledge capturing for functional semantics may be prefixed by @FunctionalSemantics and may be annotated as @FunctionalSemantics (Component, FunctionalTerm, FunctionalDescription). The functional semantics may be useful when the screen has images. The functional semantics may also be useful for keyword based testing/test reuse and subsequent design/architecture modelling.

The logic 400 may generate, by the test case generation circuitry, a summarized model of the GUI from the GUI information (420).

Figure 5:
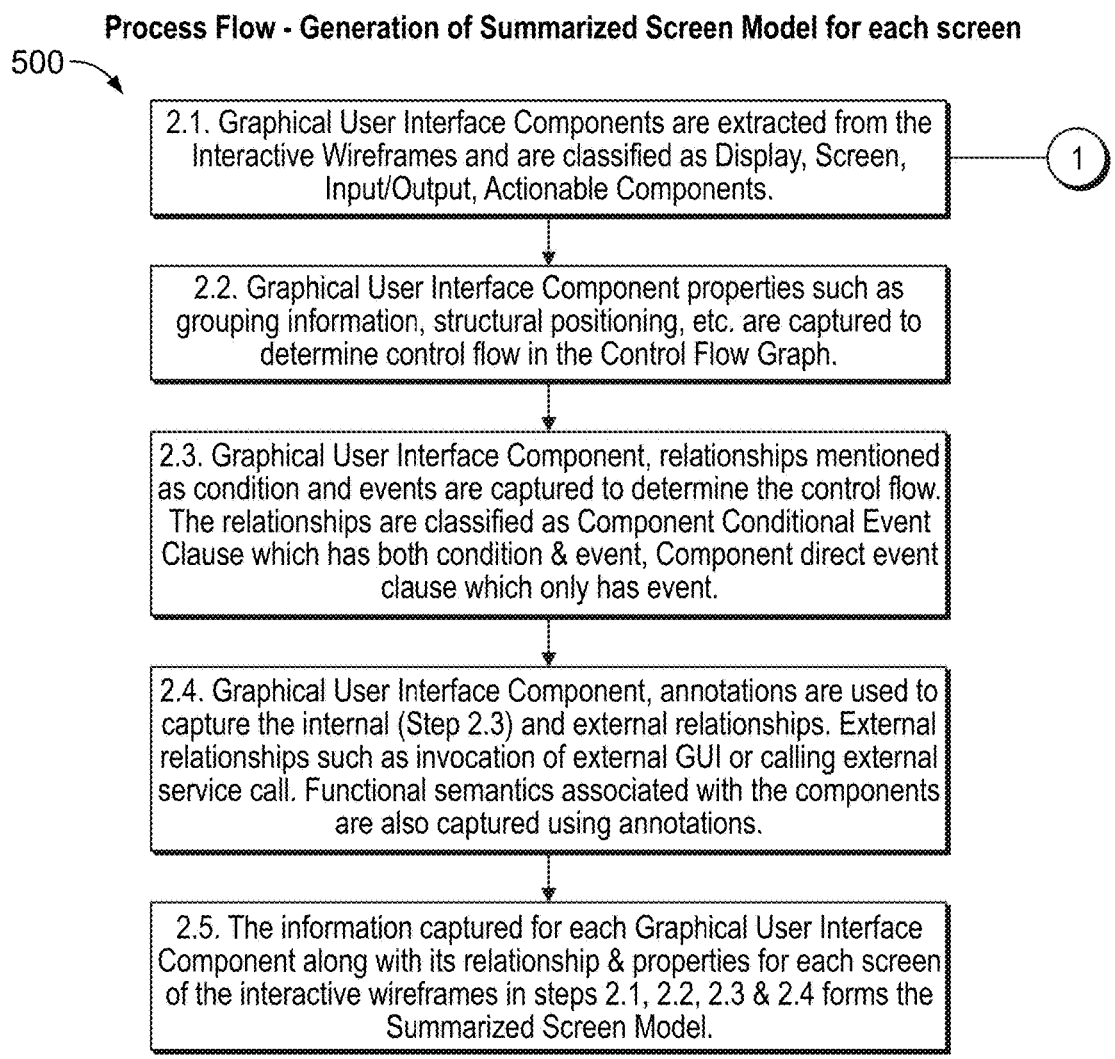
FIG. 5 shows an example of process flow for generation of summarized screen model for each screen.

FIG. 5 shows an example of process flow 500 for generation of a summarized screen model for each screen. The summarized screen model may be generated by using a summarized screen model generator. The summarized screen model generator may convert the extracted information into a canonical model that may be referred to as the summarized screen model. As shown in FIG. 5, GUICs may be extracted from the Interactive wireframes and may be classified as display, screen, input/output, and/or actionable components (2.1).

The summarized screen model may classify events as conditional event or direct event. The relationships may be classified as Component Conditional Event Clause (CCEC) which may have both condition and event. Component direct event clause may only have events. CCEC may trigger actions based on outcome of a condition, while the component direct event clause may trigger unconditional actions.

GUICs and annotations may be used to capture the internal and external relationships. External relationships may be relationships such as invocation of external GUI or calling external service call. Functional semantics associated with the components may also be captured using annotations (2.4). The information captured for each GUIC along with its relationships and properties for each screen of the interactive wireframes forms the summarized screen model (2.5).

Further, the summarized screen model may identify GUICs that are relevant to testing. Those relevant GUICS may be Behavioral User Interface Components (BUIC). BUIC may also be used for generation of a Screen Model. The properties of GUIC components such as grouping information, structural positioning may be captured in order to determine control flow in the Control Flow Graph (2.2). GUICs and relationships such as condition and events may be captured to determine the control flow (2.3).

The control flow graph may be represented as G(N; E), where N nodes of the graph may stand for the component in the interactive wireframe, and E edges of the graph may contain the (Condition, Event-Type) which may determine the transition from source component to destination component based on the condition. Edges may be annotated by the internal and external behavioural events. The control flow graph may be used to represent the screen model.

The logic 400 may generate the screen navigation model. The Screen Navigation Model may be generated by using the Screen Navigation Model Generator. The Screen Navigation Model may be generated from the summarized screen models of the interactive wireframes. This model may be used to perform the reachability analysis on the screens of the interactive wireframes. Any screen which may be left out may trigger the alert from the specification elicitation perspective (430).

The Screen Navigation Model (SNM) may be based on the 'Navigate' Event-Type associated with GUICs. SNM may be a directed graph G=(N, E) in which N is a set of nodes and E={(n, m)|n, m∈N} may be a set of edges representing transitions between nodes. SNM nodes may be only of type Screen. Different types of edges may be used in SNM to distinguish the transitions resulting from either conditional or direct events.

SNM analysis may help to identify requirement gaps and provide assistance during design and testing phases. The degree of a node in SNM graph may be defined as the number of edges incident to it. An isolated node may be a node with in-degree of zero. An isolated node may identify a missing navigational flow in a prototype. From a testing perspective, an edge with a conditional event transition (having business rule) may be given a higher weight-age as compared to an edge with a direct event. The node with high in-degree and out-degree metrics (considering the weight-age of edges) may help to identify important screen nodes of an application, which then may get due focus during design and test phases.

The logic 400 may generate, by the test case generation circuitry, a screen model for selected screens of the GUI using a subset of extracted GUI information in the summarized model (440), where the screen model may include a behavioral flow for each screen, and the subset of the extracted GUI information for generating the screen model may include the relationships between the GUICs and structural positioning of the GUICs.

Figure 6:
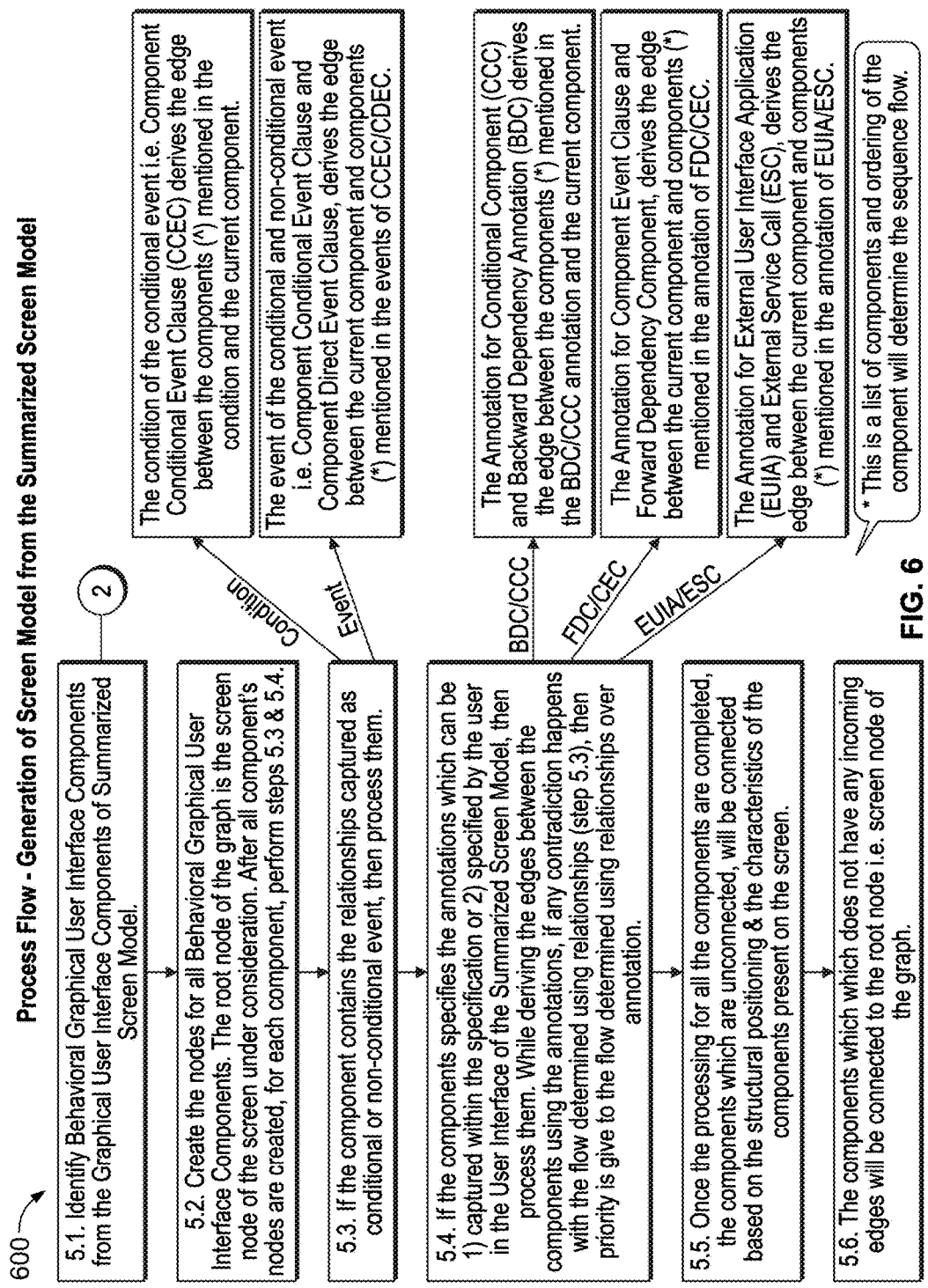
FIG. 6 shows an example of process flow for generation of screen model from the summarized screen model.

FIG. 6 shows an example of process flow 600 for generation of screen model from the summarized screen model. The screen model (SM) may be generated by using a Screen Model Generator. The screen model may be based on the events (business rules and navigational flow). A Screen Model may depict the flow relationship between GUICs. SM may a directed graph G=(N, E) in which N is a set of nodes and E={(n, m)|n, m∈N} may be a set of edges representing transitions between nodes. Nodes in SM may represent GUICs such as Screen, Text-box, Button etc. Edges may be used in SM to represent transitions resulting from events. The actionable BUIC like button, link etc. may create an OR flow i.e. a testing scenario of the graph.

The screen model may be generated by first identify Behavioral Graphical User Interface Components (BUIC) from the GUICs of the summarized screen model (5.1). In addition, the screen model may be generated from the summarized model by the following logic:

1) Create a node for each BUIC identified in the summarized screen model (5.2).

2) The node (type=Screen Node) created for the screen under consideration may become the root node for the SM.

3) Two steps may be taken to determine connections (edges) between nodes. The first step may use event information associated with the GUICs.

4) Iterate through each node (say n) in the list of created nodes in step 1 and figure out the events and process them as mentioned in steps 5, 6, 7.

5) If the event is conditional event (5.3 and 5.4) then
  a) The GUICs mentioned in the Conditional Clause may be ordered as mentioned in the condition, and become the predecessor nodes of the node (n) under process.
  b) The GUICs mentioned in the Event Clause may become the successor nodes of the node (n) under process.

6) The sub-graph created in step 5 may be termed as conditional event sub-graph and may become the part of SM.

7) If the event is direct event, then we continue with step 5(b). The sub-graph created here may be termed as direct event sub-graph and may be become the part of SM.

8) In some cases, the conditional events may not reference all GUICs on a screen. This would result in orphaned nodes in a SM. To connect such potential orphan nodes, a second approach using the structural positioning of GUICs on the screen may be used (5.5).

9) The isolated GUIC nodes with zero incoming edges may be assumed to be top-most components on a screen, and may be connected to the root node of a SM (5.6).

The GUICs in the condition may determine the backward flow and the event may determine the forward flow. The graph obtained, using the connections of the conditional event may be known as conditional sub-graph.

The logic 400 may generate, by the test case generation circuitry, an application model by combining the screen models for each screen into a unified representation (450).

FIG. 7 shows an example of process flow 700 for generation of application model from the screen models. The application model may be generated by using an application model generator. The Application Model (AM) may be generated, by combining all screen models of the prototype. The AM may also be a directed graph, following the conventions of the SM. The application model may represent the model for an entire application.

The application model may be generated from the screen models with:

1) Start processing from the initial Screen Model of the prototype. Use the graph traversal techniques (BFS/DFS) to traverse the Screen Model (710).

2) While traversing the Screen Model, on encountering the screen node (for the different screen), replace the screen node with the actual Screen Model (720).

3) Continue traversing the screen model graph, until all nodes are not traversed. Perform step 2 on encountering of the screen node (730).

4) Once all the nodes are traversed, the final graph generated may be the Application Model.

The application model may contain all information pertaining to the prototype, including its constituent screens, GUICs, GUIC relations within a screen, application behavior etc.

The logic 400 may traverse, by the test case generation circuitry, the application model to generate a test path comprising a sequence of the GUICs and event types for the GUICs. The logic 400 may generate, by the test case generation circuitry, test cases using the sequence of the GUICs and the event types included in the test path and the semantic knowledge stored in the semantic knowledge database for the GUI (460).

FIG. 8 shows an example of process flow 800 for generation of test cases based on semantic knowledge. Once the visual requirements specified in a prototype are automatically analyzed to generate the various models, the generate test cases may be generated from the Application Model. Test case generation process may include:

1) Test path identification: identify optimal test paths (6.1).

2) Test case generation: A test path may typically be represented as a sequence of nodes and edges (6.2), and may need to be converted into human understandable test-case description. To transform the test path to English language test-cases, we leverage the 'semantics' of the nodes (GUICs) and edges (conditional and direct events) (6.3).

FIG. 9 shows an example of semantic knowledge in a table format 900 for the GUI components. In FIG. 9, the examples of semantic knowledge for the GUICs 902 are shown. As shown in FIG. 9, for a text-box (an Input GUIC), the semantic is of 'entering value'. Hence, for a text-box GUIC node in a test path, the text-box may be replaced with a template 'Enter #value# in the $text-box$ field'. Here #value# may denote test-data that may fill-in the template, and $text-box$ may represent the particular text-box under consideration.

Other examples of semantic knowledge for the event 904 are also shown in FIG. 9. As shown in FIG. 9, for an application behavior event like 'Hide', the 'Hide' event may have a semantic of hiding a GUIC. Hence the related template may look like 'ASSERT that $Component$ is not visible.' Since 'Hide' is an action, ASSERT may be used to verify that the action is indeed performed.

The transformation of a test path into a test case may use semantics of GUICs and events. For each GUIC/Event type, its corresponding template from the semantic tables may be looked-up and may be used in the test case generation.

The logic 400 may display, by display generation circuitry, the generated test cases in a test case window. The test case window may be a customized window or may also be an Excel spreadsheet. After the test cases are displayed, the test cases may be verified and augmented by a test engineer. These test-cases may be stored in a test management tool stored in a data repository for the future use.

Figure 10:
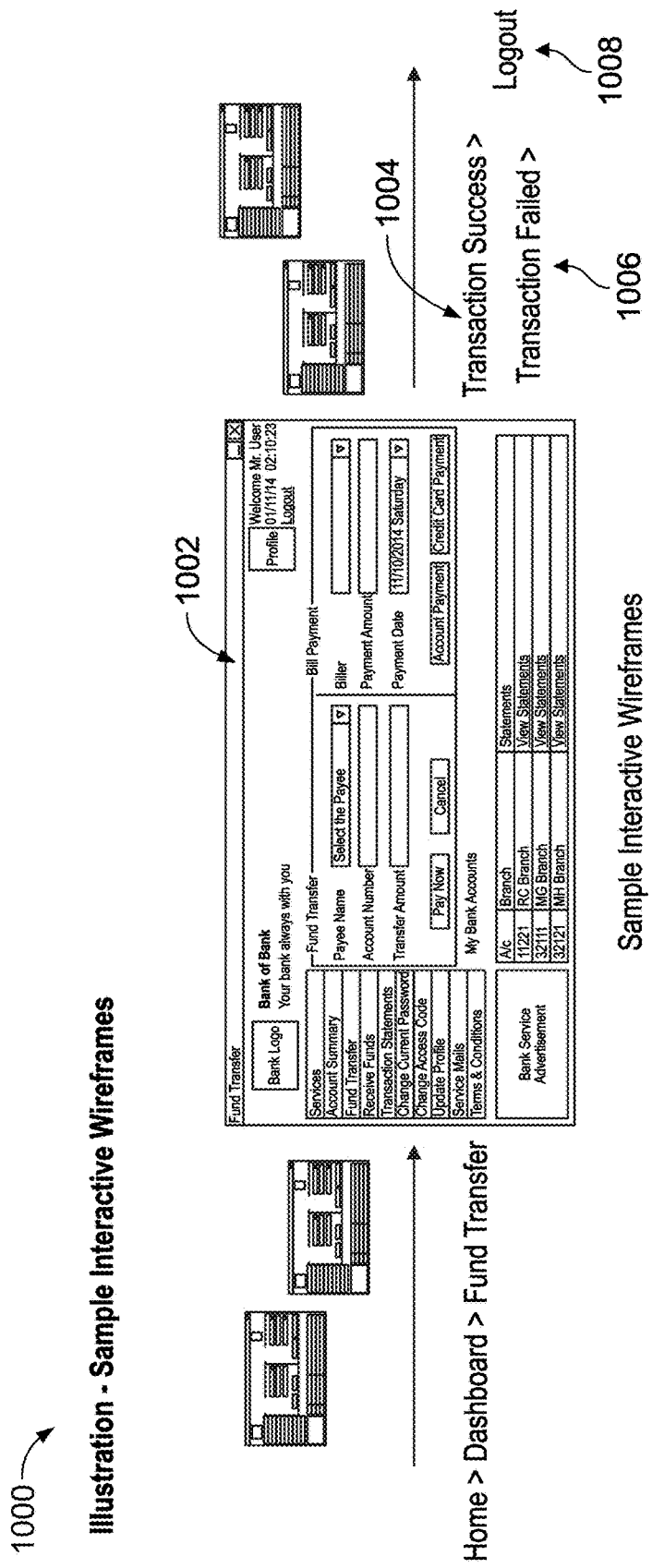
FIG. 10 illustrates a sample of interactive wireframes.
Figure 11:
FIG. 11 illustrates a sample of an interactive wireframe screen.

FIG. 10 illustrates a sample of interactive wireframes. Interactive Wireframes 1000 may be referred to as prototypes, and may be used to capture the application specification in minute details. The prototype may capture the Fund Transfer functionality from the banking domain perspective. It may include a Home screen for login, a Dashboard screen that appears after the user is logged in, and a Fund Transfer screen 1002 wherein the user may perform fund transfer and bill payment functionality. The Fund Transfer screen 1002 may be followed by the Transaction Success 1004 or Transaction Failure 1006 screen based on the transaction status, followed by the Logout 1008 screen. Each wireframe within the Interactive Wireframes may be subsequently referred to as a screen. The screen of fund transfer 1002 may be one screen in the banking application. The fund transfer screen 1002 is also reproduced as a sample screen 1100 in FIG. 11.

Figure 12:
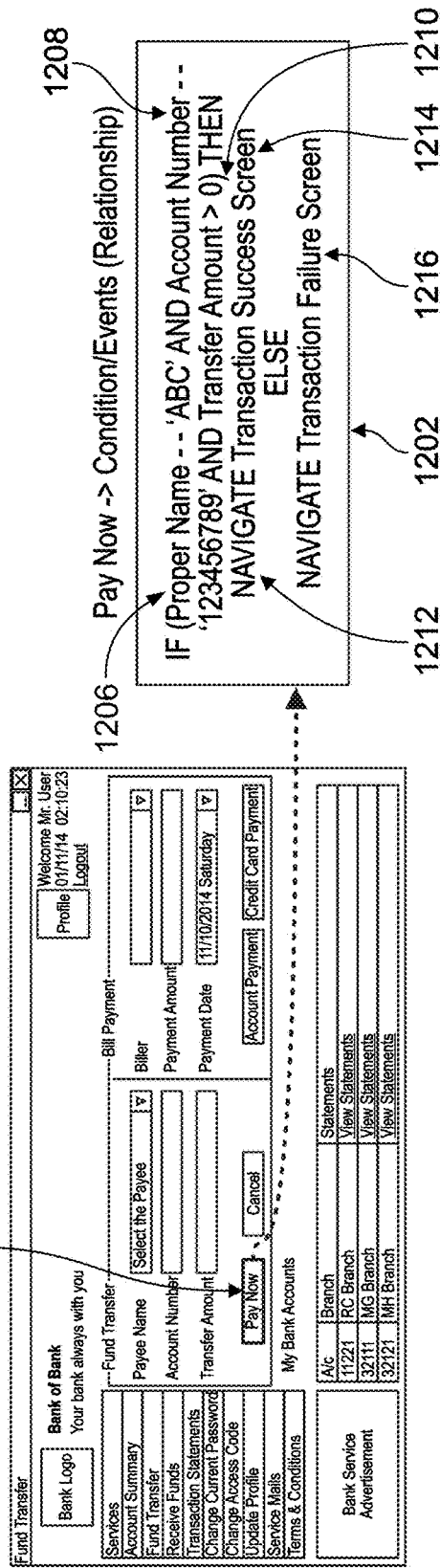
FIG. 12 shows the relationship for a funds transfer screen.

FIG. 12 shows the relationship for a funds transfer screen. The Fund Transfer screen 1200, as illustrated in FIG. 12, may include various Graphical User Interface Components (GUIC). GUICs may be classified as input, output, display and actionable components such as Button, Text-Box, Label, Image, or other classifications. GUICs may contain relationships in the form of, e.g., conditional events 1202.

In the example shown in FIG. 12: On click of the Pay Now button 1204, the values in the text boxes Payee Name 1206 and Account Number 1208 and Transfer Amount 1210 may be checked against predefined values, and based on the evaluated output, action NAVIGATION 1212 to Transaction Success Screen 1214 or Transaction Failure Screen 1216 may be triggered.

Figure 13:
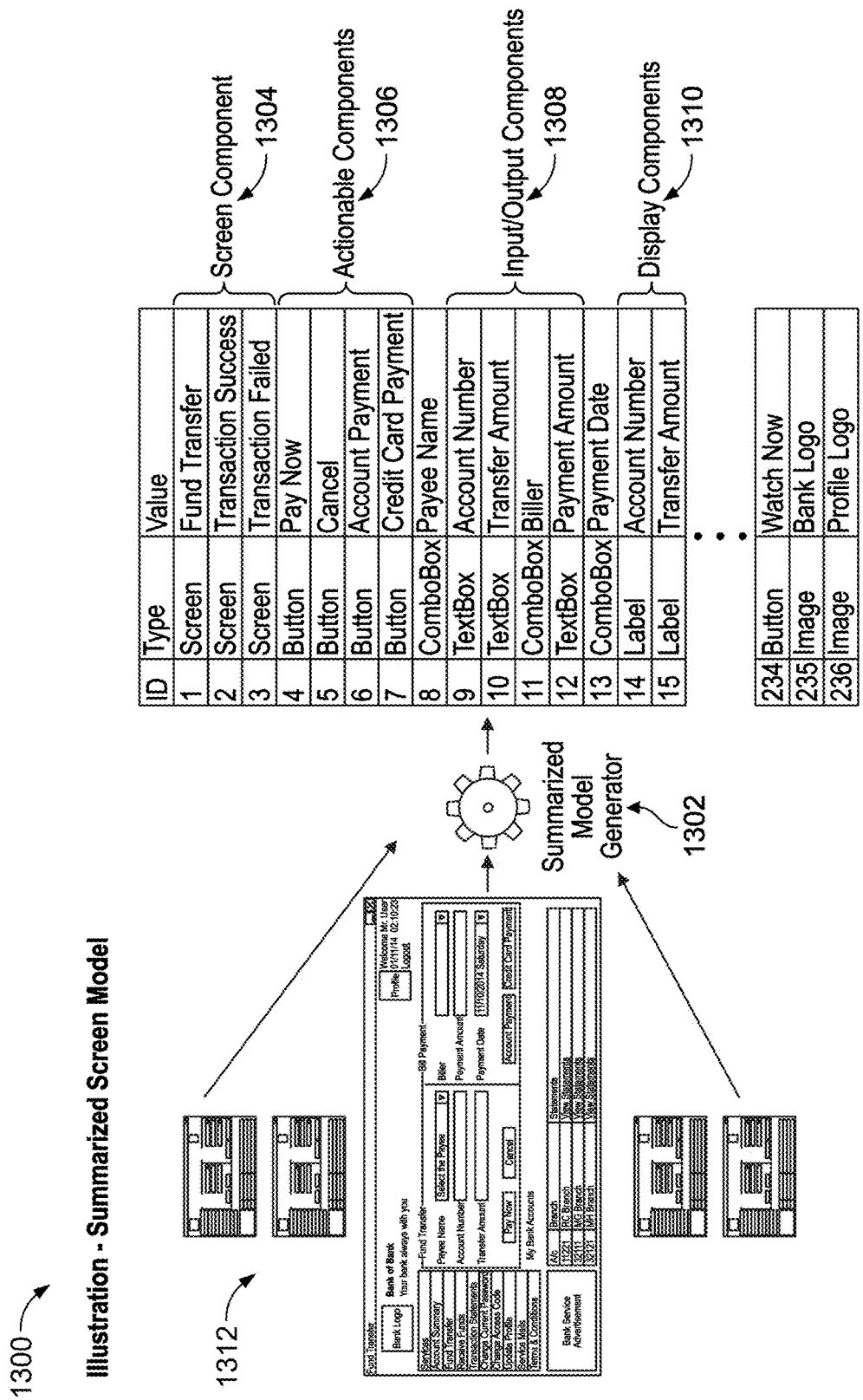
FIG. 13 illustrates the summarized screen model generation.

FIG. 13 illustrates an illustration 1300 of the summarized screen model generation. The summarized screen model may be generated by the summarized model generator 1302. As shown in FIG. 13, the information collected from the interactive wireframes 1312 may be received by the summarized model generator 1302. In FIG. 13, the output of the summarized model generator 1302 may be various types of components of the GUI and may be classified into four categories: screen component 1304, actionable components 1306, input/output components 1308 and display components 1310.

Figure 14:
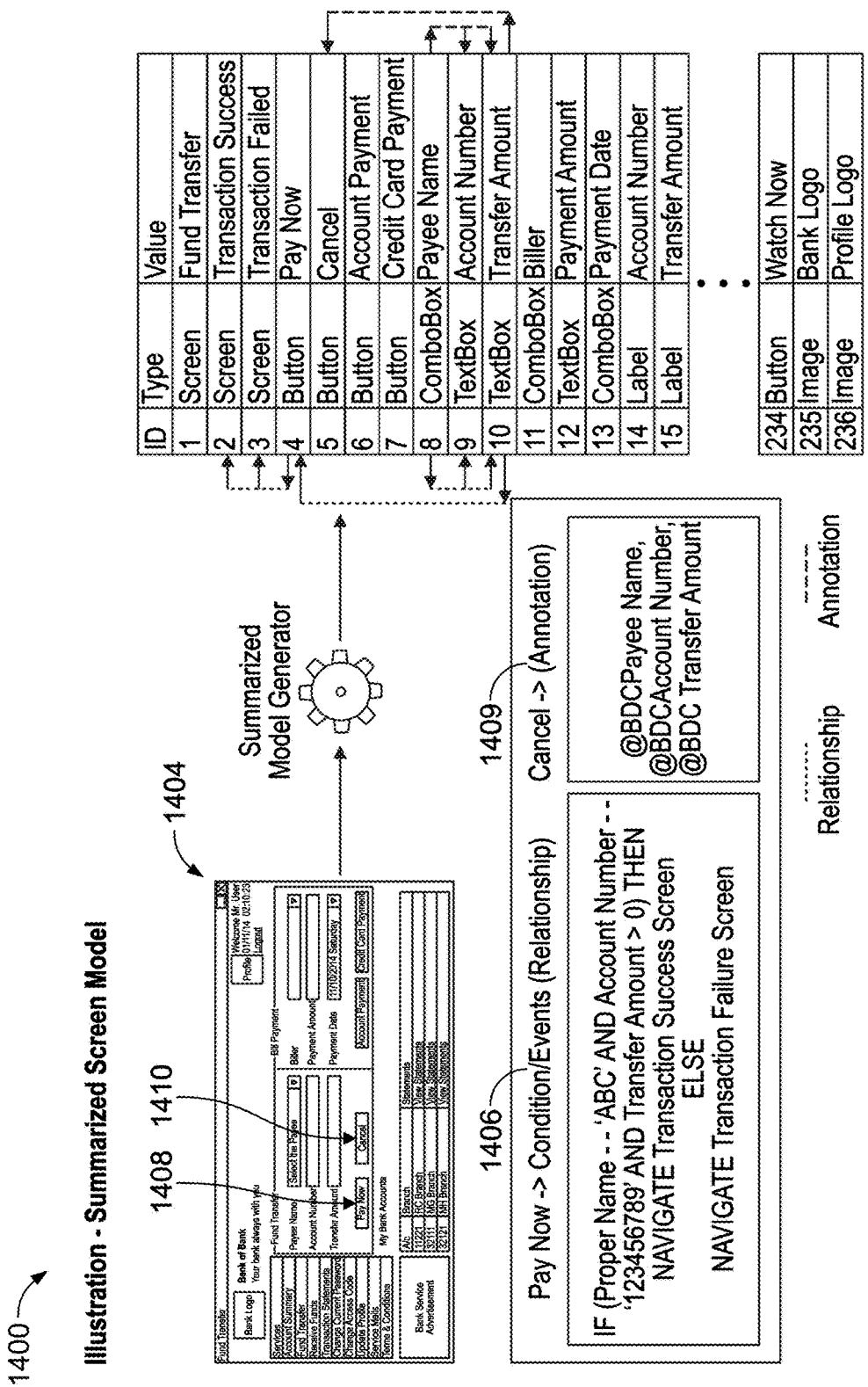
FIG. 14 shows component relationships and annotation in the summarized screen model.

FIG. 14 shows an illustration 1400 of component relationships and annotation in the summarized screen model. As shown in FIG. 14, for the screen 1404, the relationship 1406 which may include condition and/or events for the pay now button 1408. FIG. 14 also shows annotation 1409 for the cancel button 1410.

Figure 15:
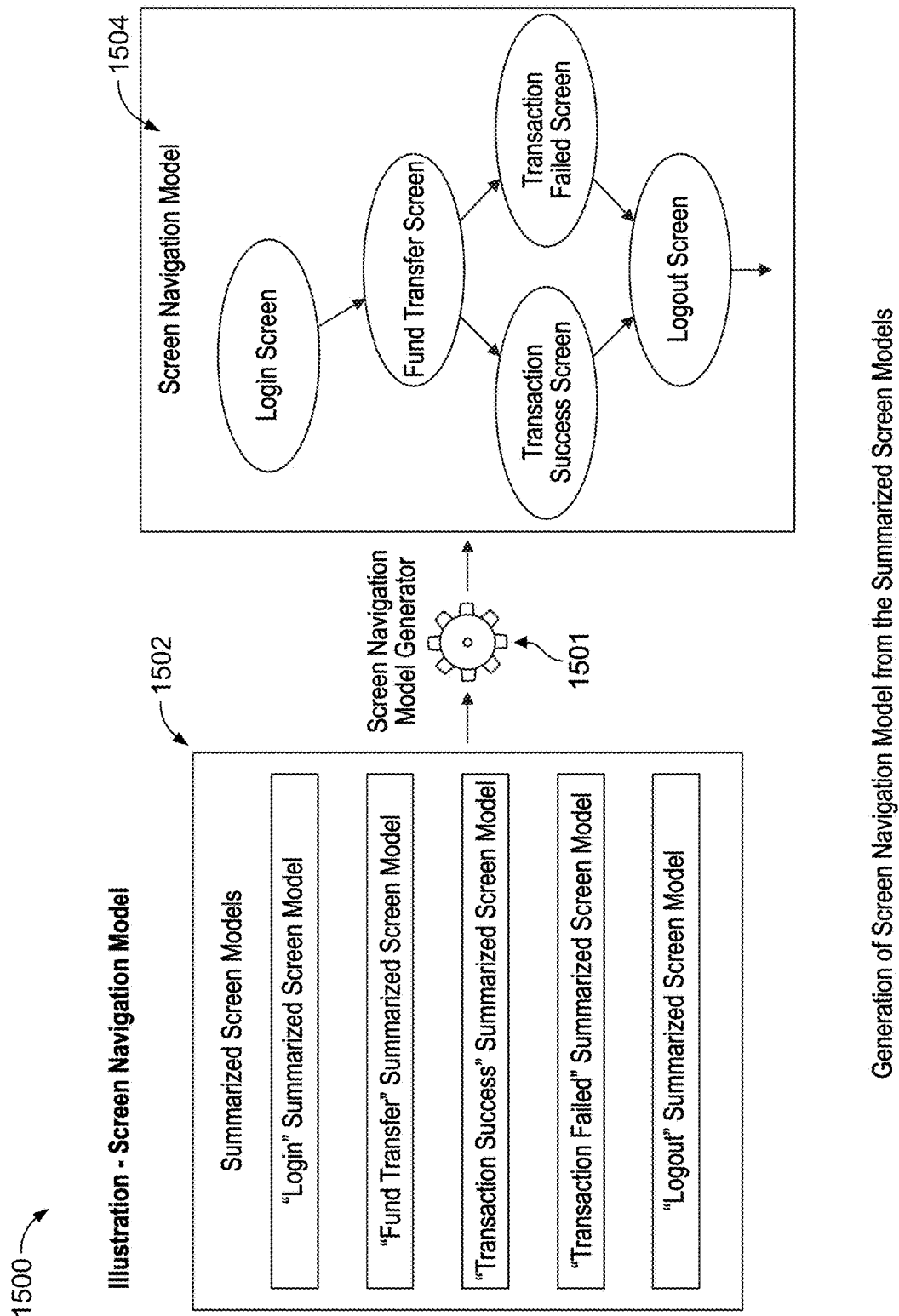
FIG. 15 illustrates the generation of screen navigation model from the summarized screen models.

FIG. 15 illustrates an illustration 1500 of the generation of screen navigation model from the summarized screen models. FIG. 15 provides an example of the operation of the screen navigational model generator 1501. The Screen Navigational Model 1504 may be generated based on the summarized Screen Models 1502 of the prototype application. This model may be used to perform the reachability analysis, flow behaviour analysis for each screen of prototype application.

Figure 16:
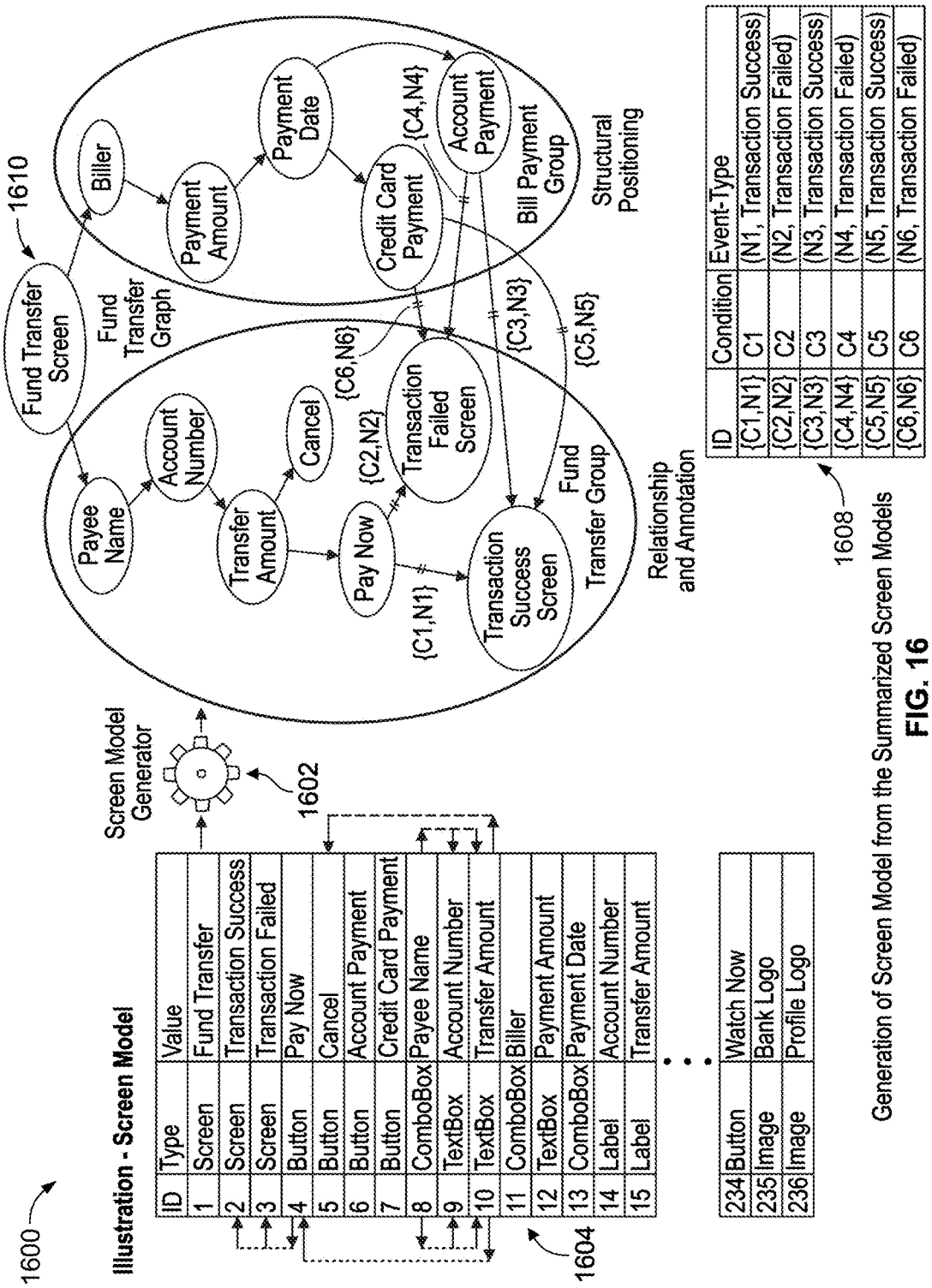
FIG. 16 illustrates generation of screen model from the summarized screen model.

FIG. 16 illustrates an illustration 1600 of a generation of screen model 1610 from the summarized screen model 1604. As illustrated in FIG. 16, for each screen of the prototype application, the screen model generator 1602 may generate the screen model 1610 based on the summarized screen model 1604 and relationship including conditions and event-type 1608. In FIG. 16, the screen model 1610 is shown as a control flow graph—G(N;E) where N nodes of the graph may stand for the component in the interactive wireframe, and E edges of the graph may contain the (Condition, Event-Type) which may determine the transition from source component to destination component based on the condition and the triggering action known as Event-Type.

Figure 17:
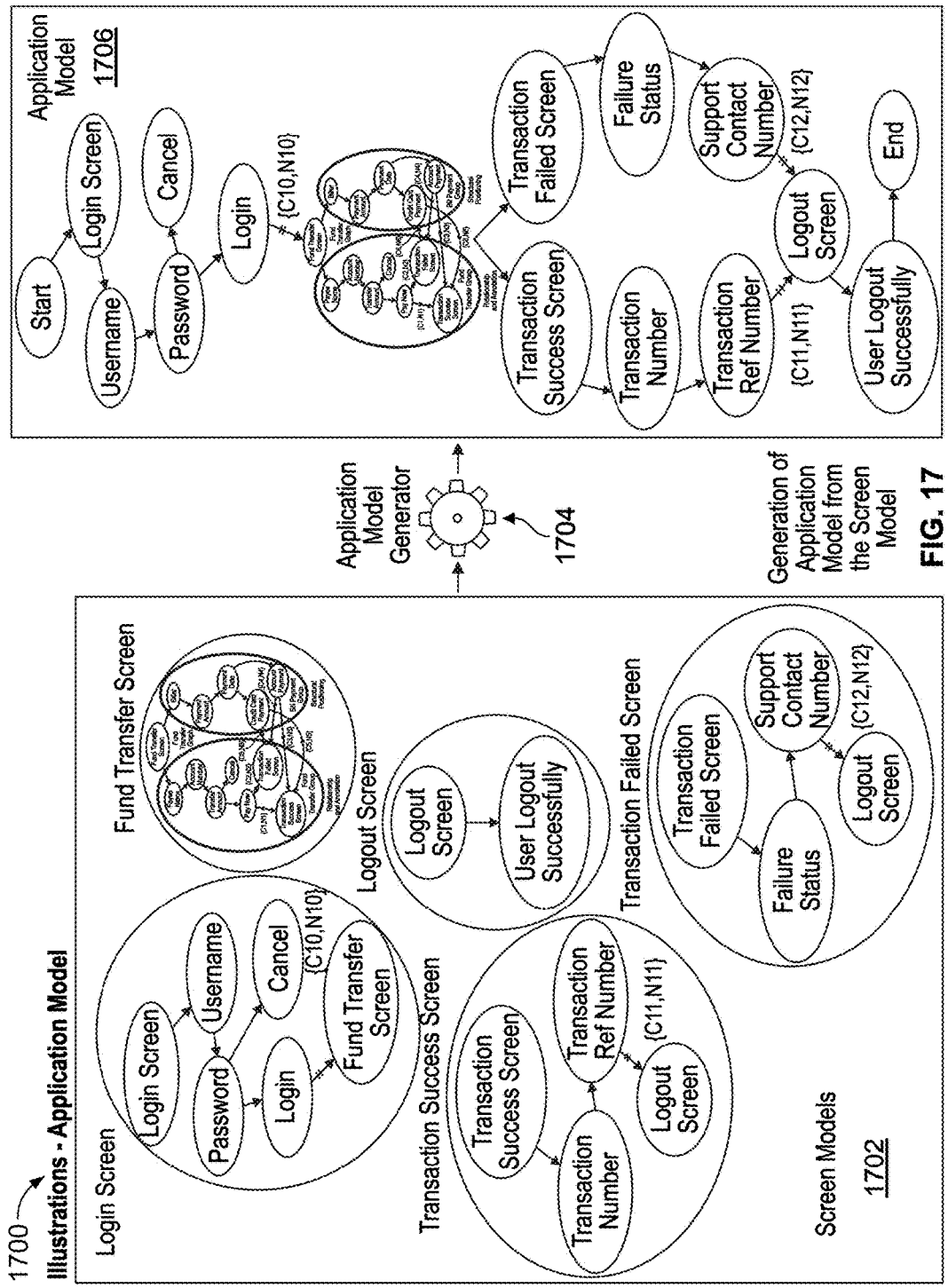
FIG. 17 illustrates the generation of application model from the screen models.

FIG. 17 illustrates an illustration 1700 of the generation of application model from the screen models. As shown in FIG. 17, the Application Model 1706 may also be represented as a Control Flow Graph—G(N; E). The application model generator 1704 may generate the Application Model 1706 by combining all the screen models 1702, which may represent the each screen captured by the prototyping tool.

Figure 18:
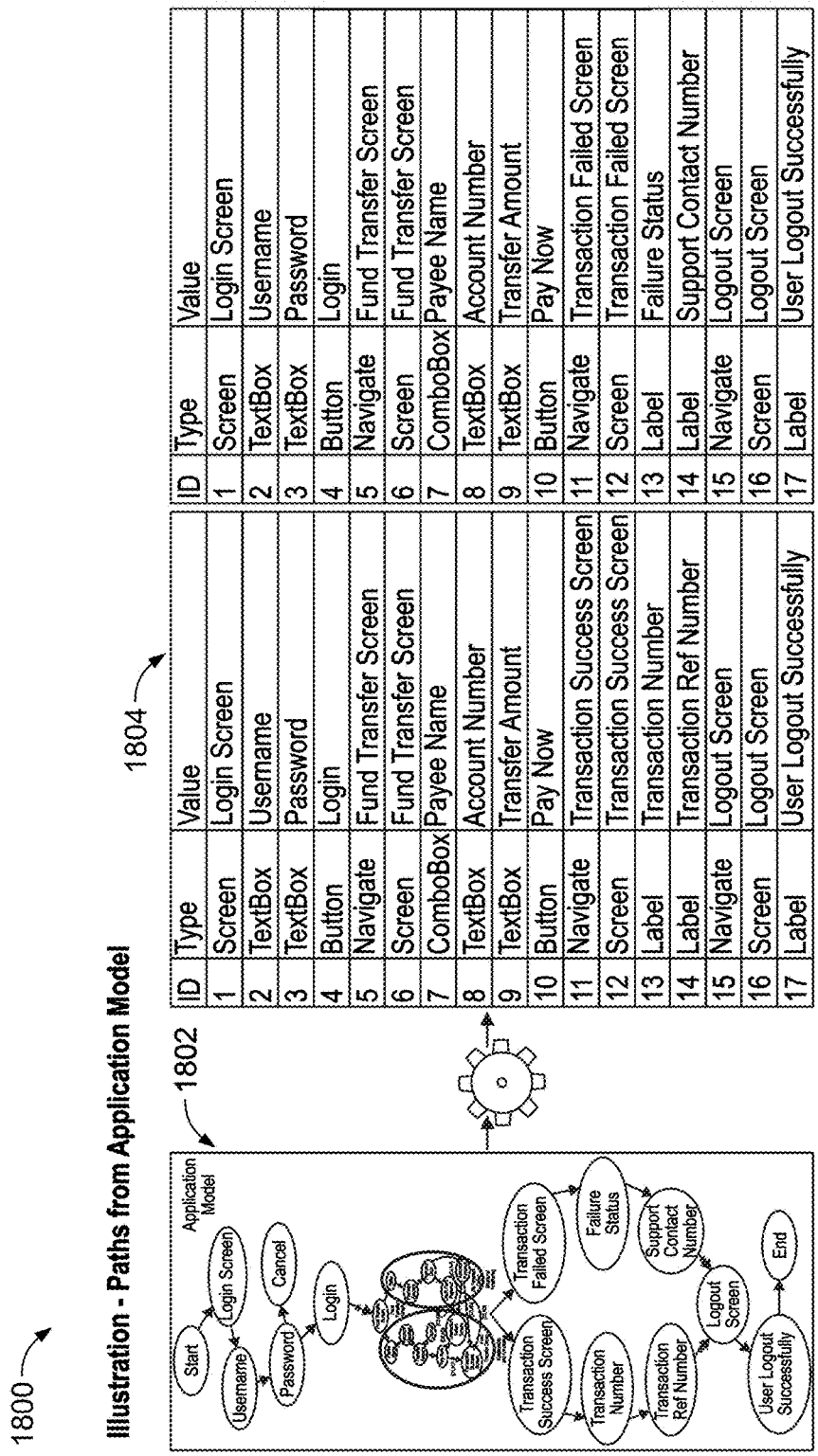
FIG. 18 shows an example of deriving paths from application model.

FIG. 18 shows an illustration 1800 of an example of deriving paths from application model. As shown in FIG. 18, the path 1804 may be a finite or infinite sequence of edges which connect a sequence of nodes. The application model 1802 may be used to develop paths as illustrated in FIG. 18.

Figure 19:
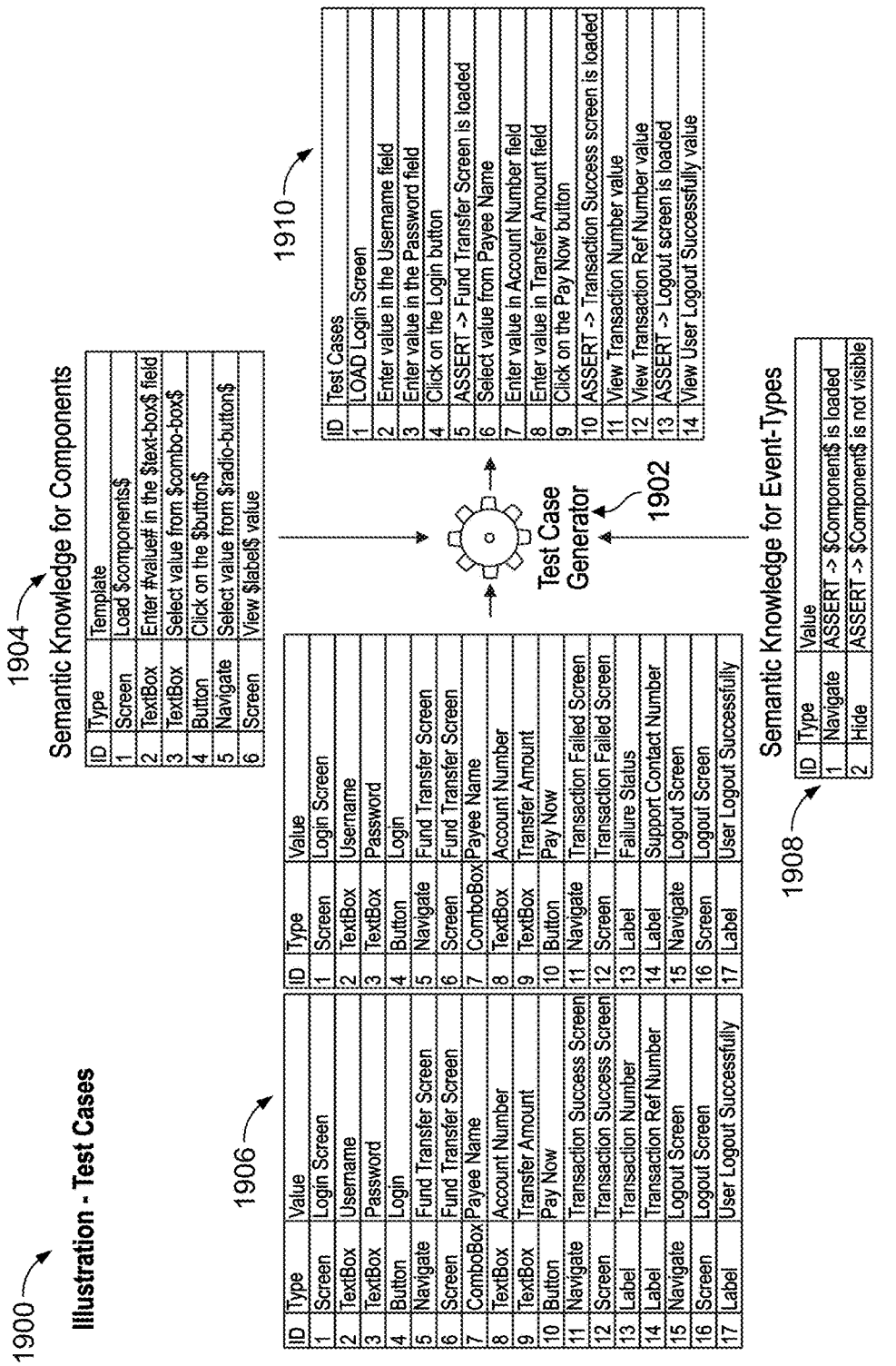
FIG. 19 illustrates the generation of test cases from the paths based on semantic knowledge.

FIG. 19 illustrates an illustration 1900 of the generation of test cases from the paths based on semantic knowledge. The test case may be a set of conditions under which a tester may determine whether an application, software system or one of its features may be working as it might be originally established for it to do. A test case may be a single step, or a sequence of steps, to test the correct behaviour/functionality, features of an application (based on the specifications). As shown in FIG. 19, the test case generator 1902 may get the input data from the test path 1906, semantic knowledge for components 1904 and semantic knowledge for event-types 1908. The test case generator 1902 may generate test cases 1910 by using the input data.

The method and/or system, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A system comprising:
a communication interface configured to receive, from an application prototyping tool:
an interactive wireframe representation of a graphical user interface (GUI) of an application, and application behavior data for the application, wherein both the interactive wireframe representation and the application behavior data were captured by the application prototyping tool;
a GUI information database configured to store the interactive wireframe representation and the application behavior data after the prototyping tool captures the interactive wireframe representation and the application behavior data;
test case generation circuitry in communication with the GUI information database, the test case generation circuitry configured to:
extract GUI information from the interactive wireframe representation and the application behavior data stored in the GUI information database, wherein the GUI information comprises Graphical User Interface Components (GUIC), GUIC behavior, and GUIC events for the GUI;
determine relationships between the GUICs and the GUIC events as part of the GUI information;

determine semantic knowledge from the relationships between the GUICs and the GUIC events, and store the semantic knowledge in a semantic knowledge database;

generate a summarized model of the GUI from the GUI information that describes GUI components categorized into one of at least a screen component, an actionable component, an input/output component, or a display component;

generate a screen model for selected screens of the GUI using a subset of extracted GUI information in the summarized model, wherein the screen model comprises a behavioral flow for each of the selected screens, and the subset of the extracted GUI information for generating the screen model comprises the relationships between the GUICs and structural positioning of the GUICs;

generate an application model by combining the screen models for each of the selected screens into a unified representation according to the behavioral flow for each of the selected screens;

traverse the application model to generate a test path comprising a sequence of the GUICs and event types for the GUICs; and generate test cases using the sequence of the GUICs and the event types included in the test path and the semantic knowledge stored in the semantic knowledge database for the GUI; and display generation circuitry configured to display the generated test cases in a test case window.

2. The system of claim 1, wherein the GUIC comprises a screen component, a display component, an input/output component, an actionable component, or any combination thereof.

3. The system of claim 1, wherein the application behavior data comprises internal behavior events and external behavior events.

4. The system of claim 1, wherein the GUI information further comprises component conditional event clauses (CCEC) specifying conditions and component events.

5. The system of claim 4, wherein the CCEC further comprises component conditional clauses (CCC) and component event clauses (CEC), wherein the test case generation circuitry is configured to associate the CCC and the CEC with the GUIC to determine the relationships.

6. The system of claim 1, wherein the GUI information further comprises annotations, wherein the test case generation circuitry is configured to use the annotations to capture an internal behavioral event, or an external behavior event, or semantic knowledge associated with the GUIC, or any combination thereof.

7. The system of claim 6, wherein the test case generation circuitry is configured to capture the annotations by prefixing a pre-selected tag, followed by an annotation category, where the annotation category comprises the internal behavioral event, the external behavior event, and the semantic knowledge.

8. The system of claim 6, wherein:

the internal behavioral event comprises a backward dependency component (BDC), a forward dependency component (FDC), the CCEC and component direct event clause (CDEC); and the external behavioral event comprises an external user interface application (EUIA), external service call (ESC), and functional semantics (FS).

9. The system of claim 1, wherein display generation circuitry is configured to display the screen model and the application model as a control flow graph.

10. A method comprising:

receiving, from an application prototyping tool, an interactive wireframe representation of a graphical user interface (GUI) of an application, and application behavior data for the application, wherein both the interactive wireframe representation and the application behavior data were captured by the application prototyping tool;

storing the interactive wireframe representation and the application behavior data into a GUI information database after the prototyping tool captures the interactive wireframe representation and the application behavior data;

extracting, by test case generation circuitry in communication with the GUI information database, GUI information from the interactive wireframe representation and the application behavior data stored in the GUI information database, wherein the GUI information comprises Graphical User Interface Components (GUIC), GUIC behavior and GUIC events for the GUI;

determining, by the test case generation circuitry, relationships between the GUICs and the GUIC events as part of the GUI information;

determining, by the test case generation circuitry, semantic knowledge from the relationships between the GUICs and the GUIC events, and storing the semantic knowledge in a semantic knowledge database;

generating, by the test case generation circuitry, a summarized model of the GUI from the GUI information that describes GUI components categorized into one of at least a screen component, an actionable component, an input/output component, or a display component;

generating, by the test case generation circuitry, a screen model for selected screens of the GUI using a subset of extracted GUI information in the summarized model, wherein the screen model comprises a behavioral flow for each of the selected screens, and the subset of the extracted GUI information for generating the screen model comprises the relationships between the GUICs and structural positioning of the GUICs;

generating, by the test case generation circuitry, an application model by combining the screen models for each of the selected screens into a unified representation according to the behavioral flow for each of the selected screens;

traversing, by the test case generation circuitry, the application model to generate a test path comprising a sequence of the GUICs and event types for the GUICs; and generating, by the test case generation circuitry, test cases using the sequence of the GUICs and the event types included in the test path and the semantic knowledge stored in the semantic knowledge database for the GUI; and displaying, by display generation circuitry, the generated test cases in a test case window.

11. The method of claim 10, wherein the GUIC comprises a screen component, a display component, an input/output component, an actionable component, or any combination thereof.

12. The method of claim 10, wherein the application behavior data comprises internal behavior events and external behavior events.

13. The method of claim 10, wherein the GUI information further comprises component conditional event clauses (CCEC) specifying conditions and component events.

14. The method of claim 13, wherein the CCEC further comprises component conditional clauses (CCC) and component event clauses (CEC), wherein the CCC and the CEC are associated with the GUIC to determine the relationships.

15. The method of claim 10, wherein the GUI information further comprises annotations, wherein the annotations are used to capture an internal behavioral event, or an external behavior event, or semantic knowledge associated with the GUIC, or any combination thereof.

16. The method of claim 15, wherein the annotations are captured by prefixing a pre-selected tag, followed by an annotation category, where the annotation category comprises the internal behavioral event, the external behavior event, and the semantic knowledge.

17. The method of claim 15, wherein:
the internal behavioral event comprises a backward dependency component (BDC), a forward dependency component (FDC), the CCEC and component direct event clause (CDEC); and
the external behavioral event comprises an external user interface application (EUIA), external service call (ESC), and functional semantics (FS).

18. The method of claim 10, wherein display generation circuitry is configured to display the screen model and the application model as a control flow graph.

19. A system comprising:
a communication interface configured to receive, from an application prototyping tool:
an interactive wireframe representation of a graphical user interface (GUI) of an application, and application behavior data for the application, wherein both the interactive wireframe representation and the application behavior data were captured by the application prototyping tool;
a GUI information database configured to store the interactive wireframe representation and the application behavior data after the prototyping tool captures the interactive wireframe representation and the application behavior data;
test case generation circuitry in communication with the GUI information database, the test case generation circuitry configured to:
extract GUI information from the interactive wireframe representation and the application behavior data stored in the GUI information database, wherein the GUI information comprises Graphical User Interface Components (GUIC), GUIC behavior, and GUIC events for the GUI, wherein the GUIC comprises a screen component, a display component, an input/output component, an actionable component, or any combination thereof;
determine relationships between the GUICs and the GUIC events as part of the GUI information, wherein the GUI information comprises component conditional event clauses (CCEC) specifying conditions and component events, wherein the CCEC further comprises component conditional clauses (CCC) and component event clauses (CEC), wherein the test case generation circuitry is configured to associate the CCC and the CEC with the GUIC to determine the relationships;
determine semantic knowledge from the relationships between the GUICs and the GUIC events, and store the semantic knowledge in a semantic knowledge database;
generate a summarized model of the GUI from the GUI information that describes GUI components categorized into one of at least a screen component, an actionable component, an input/output component, or a display component;
generate a screen model for selected screens of the GUI using a subset of extracted GUI information in the summarized model, wherein the screen model comprises a behavioral flow for each of the selected screens, and the subset of the extracted GUI information for generating the screen model comprises the relationships between the GUICs and structural positioning of the GUICs;
generate an application model by combining the screen models for each of the selected screens into a unified representation according to the behavioral flow for each of the selected screens;
traverse the application model to generate a test path comprising a sequence of the GUICs and event types for the GUICs; and
generate test cases using the sequence of the GUICs and the event types included in the test path and the semantic knowledge stored in the semantic knowledge database for the GUI; and
display generation circuitry configured to display the screen model and the application model as a control flow graph, and display the generated test cases in a test case window.

20. The system of claim 19, wherein the GUI information further comprises annotations, wherein:
the test case generation circuitry is configured to use the annotations to capture an internal behavioral event, or an external behavior event, or semantic knowledge associated with the GUIC, or any combination thereof; and
the test case generation circuitry is configured to capture the annotations by prefixing a pre-selected tag, followed by an annotation category, where the annotation category comprises the internal behavioral event, the external behavior event, and the semantic knowledge wherein:
the internal behavioral event comprises a backward dependency component (BDC), a forward dependency component (FDC), the CCEC and component direct event clause (CDEC), and
the external behavioral event comprises an external user interface application (EUIA), external service call (ESC), and functional semantics (FS).

* * * * *